United States Patent
Chen (10) Patent No.: US 9,425,680 B2
(45) Date of Patent: Aug. 23, 2016

(54) SWITCHING REGULATOR WITH RIPPLE-BASED CONTROL AND METHOD FOR SWITCHING REGULATOR WITH RIPPLE-BASED CONTROL

(71) Applicant: Realtek Semiconductor Corp., HsinChu (TW)

(72) Inventor: Shih-Chieh Chen, Yilan County (TW)

(73) Assignee: Realtek Semiconductor Corp., HsinChu (TW)

( * ) Notice: Subject to any disclaimer, the term of this patent is extended or adjusted under 35 U.S.C. 154(b) by 21 days.

(21) Appl. No.: 14/636,144

(22) Filed: Mar. 2, 2015

(65) Prior Publication Data
US 2015/0263601 A1    Sep. 17, 2015

(30) Foreign Application Priority Data
Mar. 14, 2014    (TW) .............................. 103109741 A (51) Int. Cl.
*H02M 1/14* (2006.01)
*H02M 3/156* (2006.01)

(52) U.S. Cl.
CPC ............... *H02M 1/14* (2013.01); *H02M 3/156* (2013.01)

(58) Field of Classification Search
None
See application file for complete search history.

(56) References Cited

U.S. PATENT DOCUMENTS

| | | | | |
|---|---|---|---|---|
| 2004/0146101 A1* | 7/2004 | Pearce | .................. | H02M 3/157 375/238 |
| 2005/0017703 A1* | 1/2005 | Walters | ................. | H02M 3/156 323/288 |
| 2005/0134244 A1* | 6/2005 | Sanzo | ................... | H02M 3/156 323/283 |
| 2007/0035281 A1* | 2/2007 | Kuroiwa | ............... | H02M 3/156 323/222 |
| 2007/0165427 A1* | 7/2007 | McDonald | ............ | H02M 3/156 363/41 |
| 2007/0236188 A1* | 10/2007 | Gibson | ............... | H02M 3/1563 323/225 |

(Continued)

FOREIGN PATENT DOCUMENTS

CN    101145732 A    3/2008

*Primary Examiner* — Timothy J Dole
*Assistant Examiner* — Yusef Ahmed
(74) *Attorney, Agent, or Firm* — Winston Hsu; Scott Margo (57) ABSTRACT

A ripple-based control switching regulator includes a switch, an inductor, a capacitor, an output voltage processing unit and a control unit. Where the switch is utilized to output selectively output a first reference voltage or a second reference voltage as an output voltage according to a control signal. The inductor is coupled to the switch, and produces an inductor output voltage according to the output voltage. The capacitor is coupled to the inductor. The output voltage processing unit is used to output a processed inductor output voltage according to the output voltage and the inductor output voltage. The control unit is used to output the control signal according to at least the processed inductor output voltage.

11 Claims, 5 Drawing Sheets

(56) References Cited

U.S. PATENT DOCUMENTS

| | | | |
|---|---|---|---|
| 2008/0088284 A1* | 4/2008 | Weng | H02M 3/1563 323/271 |
| 2008/0106917 A1* | 5/2008 | Holt | H02M 3/157 363/26 |
| 2008/0197828 A1* | 8/2008 | Michishita | H02M 3/156 323/282 |
| 2009/0322303 A1* | 12/2009 | Hirata | H02M 3/156 323/284 |
| 2010/0066328 A1* | 3/2010 | Shimizu | H02M 3/1588 323/282 |
| 2010/0327836 A1* | 12/2010 | Li | H02M 3/1588 323/283 |
| 2012/0038341 A1* | 2/2012 | Michishita | H02M 3/158 323/284 |
| 2012/0217941 A1* | 8/2012 | Chen | H02M 3/156 323/271 |
| 2013/0015830 A1* | 1/2013 | Zhang | H02M 1/14 323/282 |
| 2013/0063102 A1* | 3/2013 | Chen | H02M 3/156 323/234 |
| 2013/0208520 A1* | 8/2013 | Michishita | H02M 3/156 363/84 |
| 2013/0249511 A1* | 9/2013 | Kalje | G05F 1/10 323/271 |
| 2013/0249518 A1* | 9/2013 | Giannopoulos | H02M 3/156 323/284 |
| 2014/0049239 A1* | 2/2014 | Labbe | H02M 3/156 323/282 |
| 2014/0132232 A1* | 5/2014 | MacLean | G05F 1/62 323/271 |
| 2015/0061632 A1* | 3/2015 | Philbrick | H02M 3/158 323/290 |
| 2015/0263617 A1* | 9/2015 | Xue | H02M 3/156 323/271 |

\* cited by examiner

SWITCHING REGULATOR WITH RIPPLE-BASED CONTROL AND METHOD FOR SWITCHING REGULATOR WITH RIPPLE-BASED CONTROL

BACKGROUND OF THE INVENTION

1. Field of the Invention

The disclosed embodiments of the present invention relate to a switching regulator, and more particularly, to a ripple-based control switching regulator and related a ripple-based control switching regulating method.

2. Description of the Prior Art

A ripple-based control switching regulator can feedback an output voltage cross a filter capacitor in real time and determine whether to charge an inductor or discharge the inductor accordingly. When a feedback output voltage is lower than a predefined reference voltage, the ripple-based control switching regulator will charge the inductor by turn on an up-bridge transistor and turn off a down-bridge transistor for a fixed on time, so as to increase the output voltage of the switching regulator. When the on time is over, and the feedback output voltage is higher than the predefined reference voltage, the ripple-based control switching regulator will discharge the inductor by turn off the up-bridge transistor and turn on the down-bridge transistor, so as to decrease the output voltage of the switching regulator.

However, since the filter capacitor has a parasitic inductor, when the switching regulator charges, the parasitic inductor of the filter capacitor will have a positive voltage. On the contrary, when the switching regulator discharges, the parasitic inductor of the filter capacitor will have a negative voltage. Thus, when the on time is over, the positive voltage of the parasitic inductor of the filter capacitor will become the negative voltage instantly, and lower the whole output voltage of the filter capacitor, and the output voltage of the filter capacitor may be lower than the predefined reference voltage again instantly and result in triggering the on time twice in a row (i.e. a double pulse). This will input too much power to the inductor and increase a subharmonic oscillation of the output voltage. Thus, the prior art often measures the inductor current directly but not the voltage of the filter capacitor to avoid the parasitic inductor effect. However, measuring the inductor current directly has higher cost and larger measuring error. Thus, an innovative ripple-based control switching regulator is required to solve the above-mentioned problems.

SUMMARY OF THE INVENTION

It is therefore one of the objectives of the present invention to provide a ripple-based control switching regulator and related method capable of a calibrating parasitic inductor effect of a filter capacitor, so as to solve the problem of harmonic oscillation.

In accordance with an embodiment of the present invention, an exemplary recovery ripple-based control switching regulator is disclosed. The exemplary ripple-based control switching regulator comprises: a switch, an inductor, a capacitor, an output voltage processing unit and a control unit. Where the switch is utilized to output selectively output a first reference voltage or a second reference voltage as an output voltage according to a control signal. The inductor is coupled to the switch, and produces an inductor output voltage according to the output voltage. The capacitor is coupled to the inductor. The output voltage processing unit is used to output a processed inductor output voltage according to the output voltage and the inductor output voltage. The control unit is used to output the control signal according to at least the processed inductor output voltage.

In accordance with another embodiment of the present invention, an exemplary ripple-based control switching regulating method for controlling a ripple-based control switching regulator comprising a switch, an inductor coupled to the switch, and a capacitor coupled to the inductor is disclosed. The ripple-based control switching regulating method comprises: utilizing the switch for selectively outputting a first reference voltage or a second reference voltage as an output voltage according to a control signal; utilizing the inductor for producing an inductor output voltage according to the output voltage; outputting a processed inductor output voltage according to the output voltage and the inductor output voltage; and utilizing the control unit for outputting the control signal according to at least the processed inductor output voltage.

Briefly summarized, the embodiments disclosed by the present invention avoid double pulse by calibrating the parasitic inductor effect, and compared with the prior art, the method of calibrating parasitic the inductor effect in the present invention has advantages of lower cost and smaller error.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
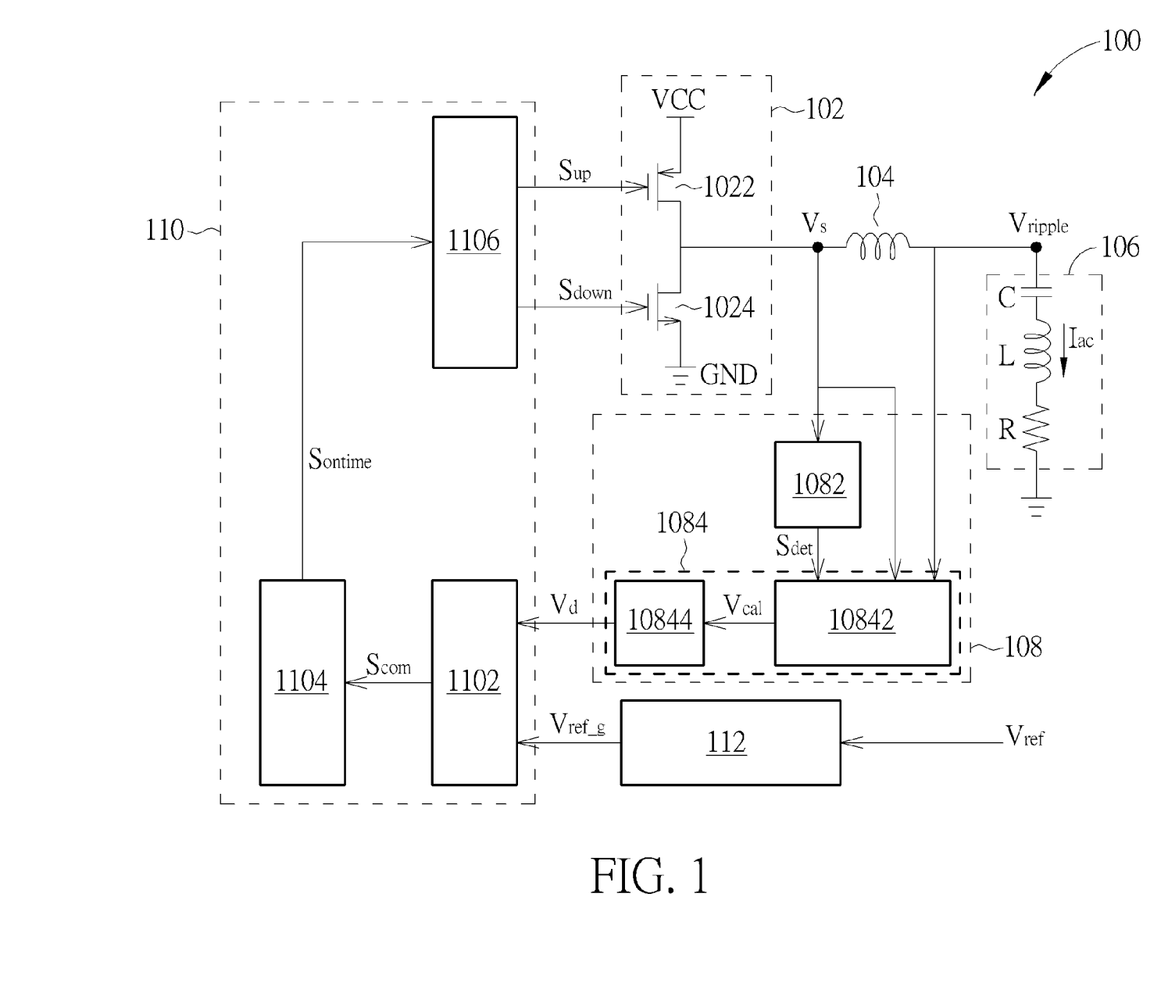
FIG. 1 shows a simplified diagram of a ripple-based control switching regulator in accordance with an embodiment of the present invention.

Please refer to FIG. 1. FIG. 1 shows a simplified diagram of a ripple-based control switching regulator 100 in accordance with an embodiment of the present invention. The ripple-based control switching regulator 100 is utilized for providing a stable voltage under different loading conditions, and main functional blocks of the ripple-based control switching regulator 100 and further details of the ripple-based control switching regulator 100 are described as below. Firstly, a switch 102 is utilized for controlling a connection a PMOS 1022 and an NMOS 1024 according to an up-bridge control signal $S_{up}$ and a down-bridge control signal $S_{down}$, so as to selectively outputting a power supply voltage VCC or a ground voltage GND as an output voltage $V_s$ (please note that the PMOS and the NMOS are not meant to be limitations of the present invention, and various switches with the same functions should fall into the disclosed scope of the present invention). Specifically, when the up-bridge control signal $S_{up}$ controls the PMOS 1022 in the switch 102 to be conducting, and the down-bridge control signal $S_{down}$ controls the NMOS 1024 in the switch 102 to be not conducting, the power supply voltage VCC will charge an inductor 104 coupled to the switch 102. On the contrary, when the up-bridge control signal $S_{up}$ controls the PMOS 1022 in the switch 102 to be not conducting, and the down-bridge control signal $S_{down}$, controls the NMOS 1024 in the switch 102 to be conducting, the ground voltage GND will discharge the inductor 104 coupled to the switch 102. In general, the ripple-based control switching regulator 100 will control the switch 102 to charge the inductor 104 for a fixed on time $T_{ontime}$ when the ripple-based control switching regulator 100 determines that an inductor output voltage $V_{ripple}$ is lower than a specific voltage $V_{ref}$ and the ripple-based control switching regulator 100 will stop charging when the on time $T_{ontime}$ is over, and the ripple-based control switching regulator 100 continues to monitor whether the inductor output voltage $V_{ripple}$ is lower than the specific voltage $V_{ref}$. Once the inductor output voltage $V_{ripple}$ is lower than the specific voltage $V_{ref}$, the ripple-based control switching regulator 100 will control the switch 102 to charge the inductor 104 for the on time $T_{ontime}$ again.

Figure 2:
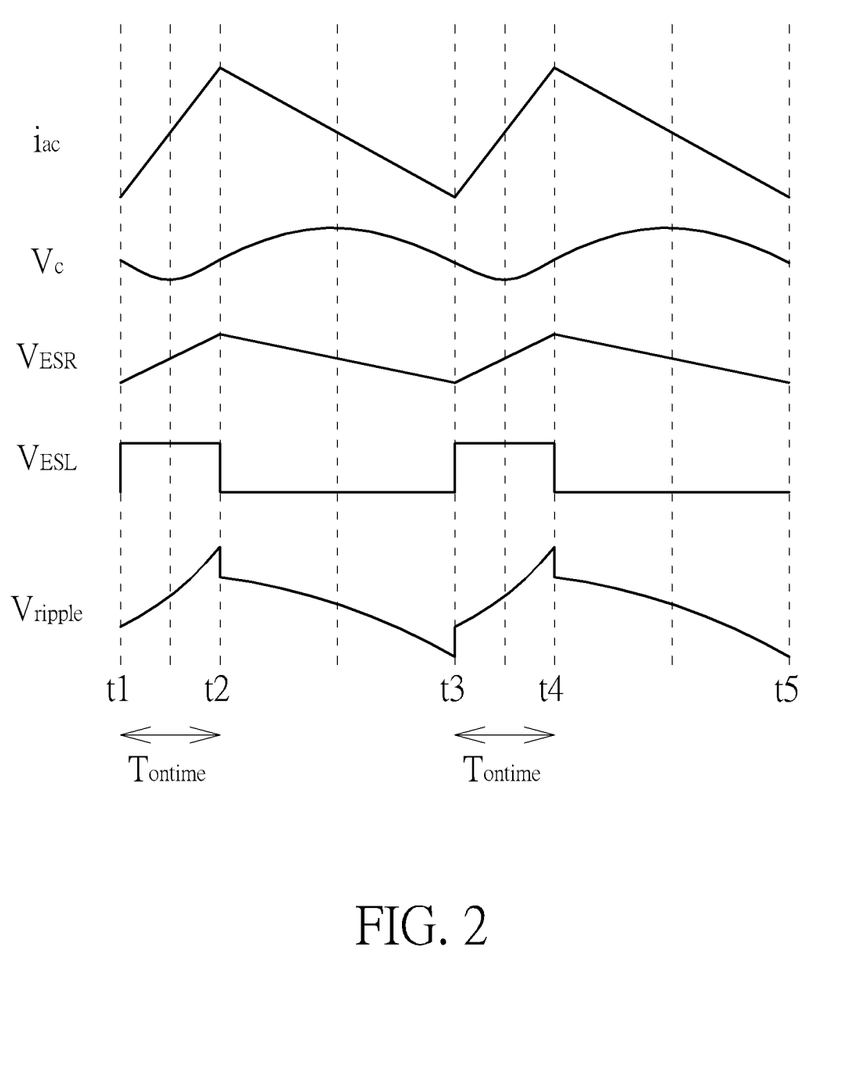
FIG. 2 shows a simplified wave diagram of voltages and currents of each element in the filter capacitor.

A filter capacitor 106 is implemented between the inductor output voltage $V_{ripple}$ and the ground voltage GND in the ripple-based control switching regulator 100, and the filter capacitor 106 has a parasitic resistor and a parasitic inductor effect, and thus the filter capacitor 106 is represented by a capacitor C, an inductor L, and a resistor R. Please refer to FIG. 2. FIG. 2 shows a simplified wave diagram of voltages and currents of each element in the filter capacitor 106. When the switch 102 charges the inductor 104 (i.e. during a time t1 to a time t2, wherein an interval of the time t1 and the time t2 is the on time $T_{ontime}$; and during a time t3 to a time t4, wherein an interval of the time t3 and the time t4 is the on time $T_{ontime}$) a current $I_{ac}$ will pass by the filter capacitor 106, and a gradient of the current $I_{ac}$ is a positive value, as shown in FIG. 2. A differential of a gradient of a voltage $V_c$ of the capacitor C is also a positive value, and a gradient of a voltage $V_{ESR}$ of the resistor R is also a positive value, and a voltage $V_{ESL}$ of the inductor L is maintain at a fixed positive value. Finally, the inductor output voltage $V_{ripple}$ can be obtained by adding the voltage $V_c$, the voltage $V_{ESR}$, and the voltage $V_{ESL}$. On the contrary, when the switch 102 discharges the inductor 104 (i.e. during a time t2 to a time t3, and during a time t4 to a time t5), a gradient of the current $I_{ac}$ is a negative value, as shown in FIG. 2. A differential of a gradient of a voltage $V_c$ of the capacitor C is also a negative value, and a gradient of the voltage $V_{ESR}$ of the resistor R is also a negative value, and a voltage $V_{ESL}$ of the inductor L is maintain at a fixed negative value.

Thus, each time when the up-bridge control signal $S_{up}$ controls the PMOS 1022 in the switch 102 to be conducting and maintain the on time $T_{ontime}$ and changes to control the NMOS 1024 in the switch 102 to be conducting afterwards, the down-bridge control signal $S_{down}$ controls the NMOS 1024 to be not conducting in the switch 102, the inductor output voltage $V_{ripple}$ will be lowered instantly since the voltage $V_{ESL}$ is lowered instantly, to make the inductor output voltage $V_{ripple}$ lower than the specific voltage $V_{ref}$, and instantly trigger the up-bridge control signal $S_{up}$ to control the PMOS 1022 in the switch 102 to be conducting and maintain the on time $T_{ontime}$ again, and it is a double pulse (not shown), which results in an over charging for the inductor 104. It is therefore one of the objectives of the present invention to use an output voltage processing unit 108 for calibrating the inductor output voltage $V_{ripple}$, that is, eliminating the parasitic inductor L (the voltage $V_{ESL}$) in the inductor output voltage $V_{ripple}$ so as to avoid bad effect caused by the double pulse.

The output voltage processing unit 108 is utilized for outputting a processed inductor output voltage $V_d$ according to the output voltage $V_s$ and the inductor output voltage $V_{ripple}$. The output voltage processing unit 108 comprises: a double pulse detecting unit 1082 and a voltage calibrating unit 1084. The double pulse detecting unit 1082 is utilized for detecting whether the output voltage $V_s$ has a double pulse to generate a detecting result $S_{det}$. For example, when a time interval of two pulses in the output voltage $V_s$ is lower than a specific time, the double pulse detecting unit 1082 determines that the output voltage $V_s$ has the double pulse. In any case, various design modifications and alterations of determining methods for the double pulse detecting unit 1082 should fall into the disclosed scope of the present invention as long as the determining methods are on the basis of the same spirit or can generate similar effects. In addition, the voltage calibrating unit 1084 is utilized for generating the processed inductor output voltage according to the detecting result $S_{det}$, the output voltage $V_s$, and the inductor output voltage $V_{ripple}$. The voltage calibrating unit 1084 comprises: a parasitic inductor calibrating circuit 10842 and a differentiator 10844. The parasitic inductor calibrating circuit 10842 is utilized for generating a calibrated output voltage $V_{cal}$ without the voltage $V_{ESL}$ of the parasitic inductor L according to the detecting result $S_{det}$, the output voltage $V_s$, and the inductor output voltage $V_{ripple}$. Please refer to FIG. 2 again. In general, a circuit designer wishes to use the information of the current $I_{ac}$ to compare with the specific voltage $V_{ref}$, but the calibrated output voltage $V_{cal}$ generated by eliminating the voltage $V_{ESL}$ of the parasitic inductor L from the inductor output voltage $V_{ripple}$ is mainly the information of the voltage $V_c$ of the capacitor C (wherein the voltage $V_{ESR}$ of the resistor R is smaller and can be omitted), and the voltage $V_c$ is required to be differentiated to form a synchronous variation with the current $I_{ac}$. In other words, after obtaining the calibrated output voltage $V_{cal}$, the differentiator 10844 is required to be utilized again for differentiating the calibrated output voltage $V_{cal}$ to generate the processed inductor output voltage $V_d$.

Figure 3:
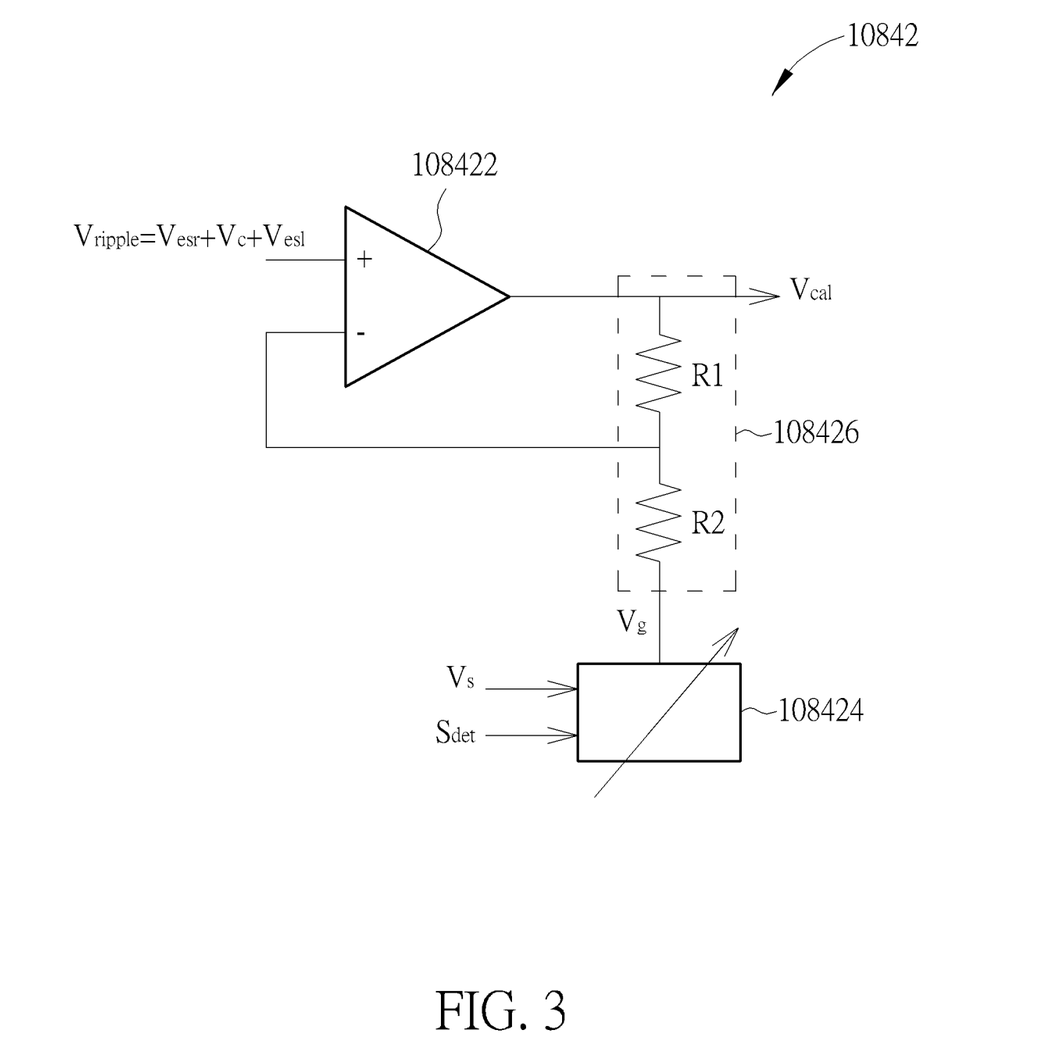
FIG. 3 shows a circuit diagram of the parasitic inductor calibrating circuit in accordance with an embodiment of the present invention.

Please refer to FIG. 3 for the parasitic inductor calibrating circuit 10842. FIG. 3 shows a circuit diagram of the parasitic inductor calibrating circuit 10842 in accordance with an embodiment of the present invention. The parasitic inductor calibrating circuit 10842 comprises: an operating amplifier 108422, a gain adjusting circuit 108424, and a voltage dividing circuit 108426.

The operating amplifier 108422 has a first input terminal, a second input terminal, and an output terminal, wherein the first input terminal is utilized for receiving the inductor output voltage $V_{ripple}$ and the output terminal is utilized for outputting the calibrated output voltage $V_{cal}$. The gain adjusting circuit 108424 has an adjustable gain value g, and is utilized for performing a gain process for the output voltage $V_s$ and generating a gain output voltage $V_g$.

$$V_g = v_s * g \qquad (1)$$

The gain value g can be adjusted according to the detecting result $S_{det}$. For example, when the ripple-based control switching regulator 100 is powered, and the detecting result $S_{det}$ shows that the output voltage $V_s$ has the double pulse, the gain value g of the gain adjusting circuit 108424 will increase from an initial gain, until the detecting result $S_{det}$ shows that the output voltage $V_s$ does not have the double pulse. When the detecting result $S_{det}$ shows that the output voltage $V_s$ has the double pulse next time, the gain value g of the gain adjusting circuit 108424 can increase from a current gain. In any case, various design modifications and alterations of determining methods for the gain adjusting circuit 108424 should fall into the disclosed scope of the present invention as long as the determining methods are on the basis of the same spirit or can generate similar effects. Please note that the wave shape of the output voltage $V_s$ is the same as that of the voltage $V_{ESL}$ of the inductor L, and thus the output voltage $V_s$ is utilized for eliminating the voltage $V_{ESL}$ from the inductor output voltage $V_{ripple}$ is, and the formula (1) can modified as follows:

$$V_g = V_{ESL} * x \qquad (2)$$

wherein a value x is a ratio of the gain output voltage $V_g$ and the voltage $V_{ESL}$ of the inductor L.

The voltage dividing circuit 108426 comprises a first resistor R1 and a second resistor R2 connected in series, wherein the first resistor R1 is coupled between the output terminal of the operating amplifier 108422 and the second terminal of the operating amplifier 108422, and the second resistor R2 is coupled between the second terminal of the operating amplifier 108422 and the gain adjusting circuit 108424, to form a negative feedback loop circuit. The voltage of the second terminal of the operating amplifier 108422 is maintained to be the same value, and a formula (3) is:

$$V_{cal} = \left(\frac{R1+R2}{R2}\right)(V_{ESR} + V_C) + V_{ESR}\left(\frac{R1+R2}{R2} - \frac{R1*x}{R2}\right) \qquad (3)$$

In this way, when $$x = \frac{R1+R2}{R1} \qquad (4)$$

The voltage $V_{ESL}$ of the inductor L in the calibrated output voltage $V_{cal}$ can be completely eliminated, that is:

$$V_{cal} = \left(\frac{R1+R2}{R2}\right)(V_{ESR} + V_C) \qquad (5)$$

Please note that after the voltage dividing circuit 108426, as shown in the formula (5), there is about a multiple relation $$\left(\frac{R1+R2}{R2}\right)$$

between the calibrated output voltage $V_{cal}$ and the voltage $V_c$ of the capacitor C (wherein the voltage $V_{ESR}$ of the resistor R is smaller and can be omitted). Thus, the specific voltage $V_{ref}$ should also have a same calibration.

Figure 4:
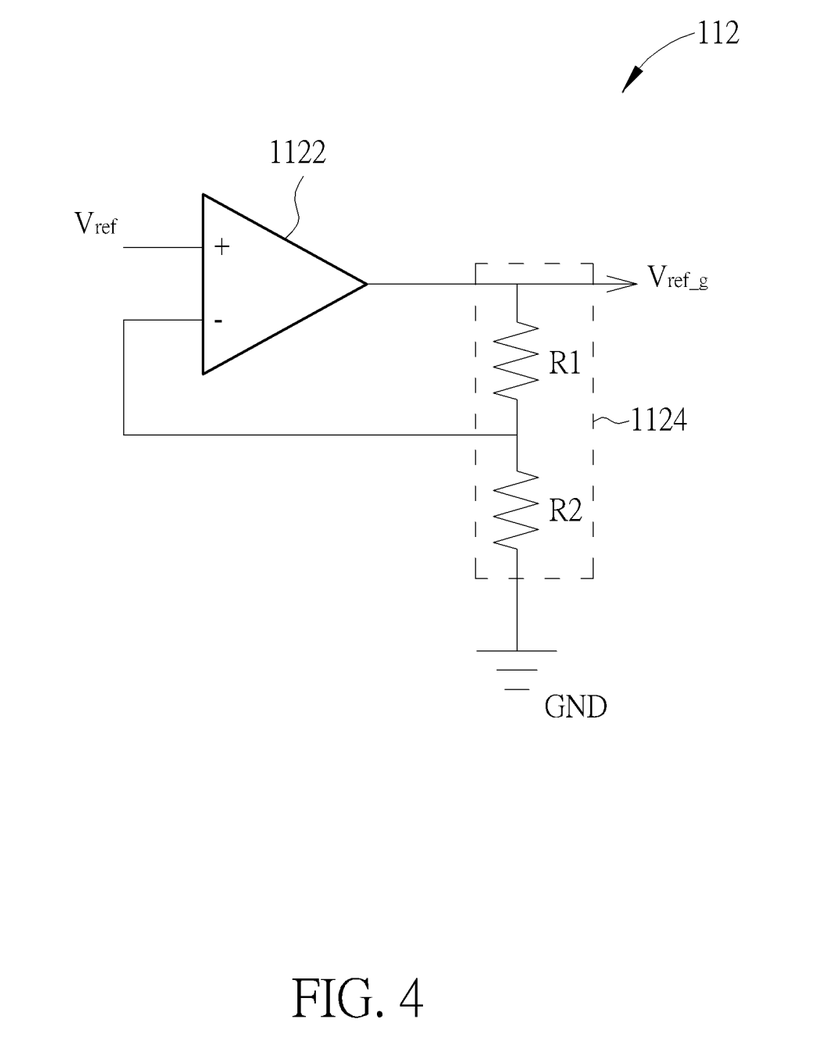
FIG. 4 shows a circuit diagram of a specific voltage gain adjusting unit in accordance with an embodiment of the present invention.

Please refer to FIG. 4. FIG. 4 shows a circuit diagram of a specific voltage gain adjusting unit 112 in accordance with an embodiment of the present invention. The specific voltage gain adjusting unit 112 comprises: an operating amplifier 1122 and a voltage dividing circuit 1124, wherein the operating amplifier 1122 has a first input terminal, a second input terminal, and an output terminal, wherein the first input terminal is utilized for receiving the specific voltage $V_{ref}$, and the output terminal is utilized for outputting a specific gain voltage $V_{ref\_g}$. The voltage dividing circuit 1124 uses the same first resistor R1 and the same second resistor R2 as the voltage dividing circuit 108426 to have the same multiple relation.

Figure 5:
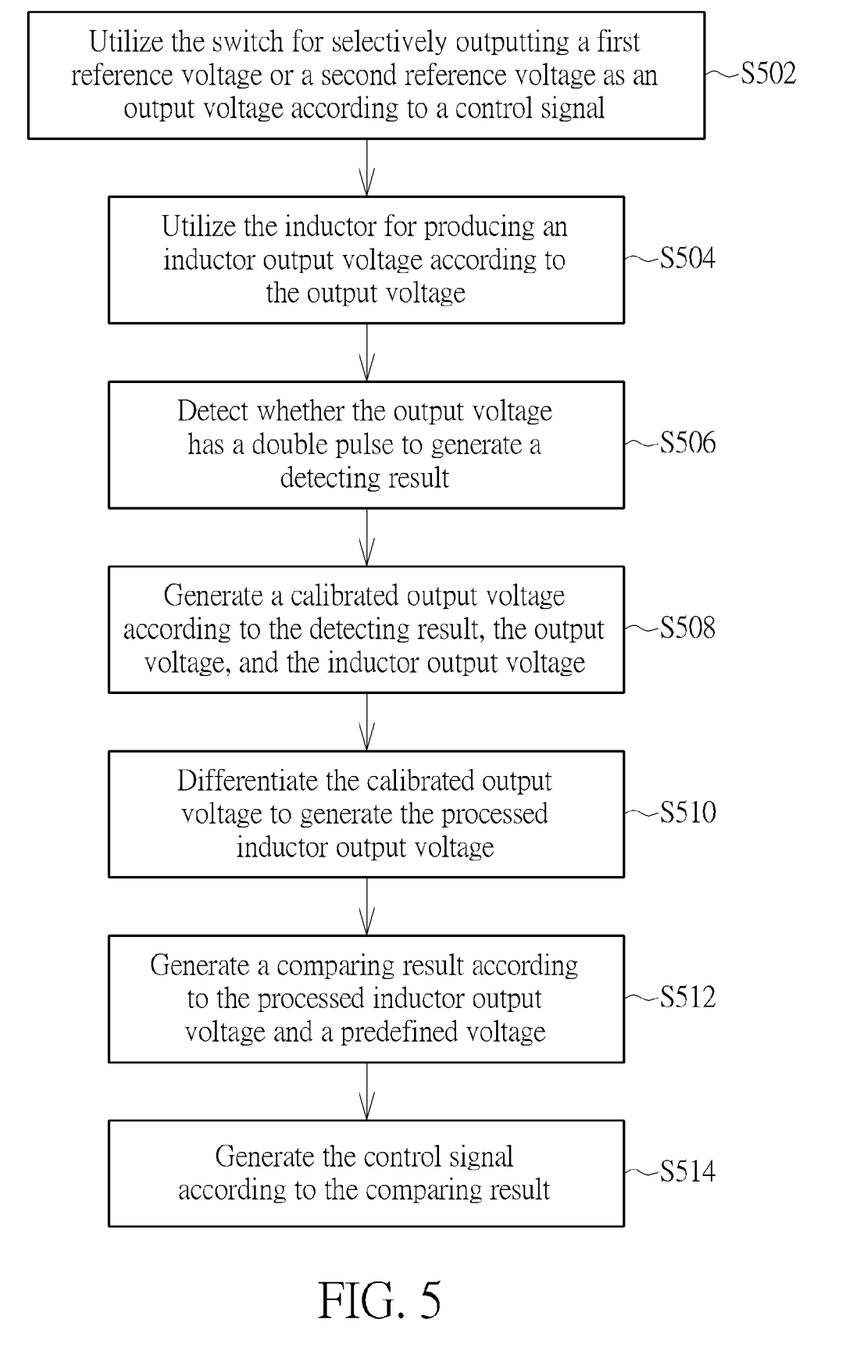
FIG. 5 is a flowchart showing a ripple-based control switching regulating method in accordance with an exemplary embodiment of the present invention.

Finally, a control unit 110 can be utilized for outputting the up-bridge control signal $S_{up}$ and a down-bridge control signal $S_{down}$ according to the processed inductor output voltage $V_d$ and specific gain voltage $V_{ref\_g}$. The design of the control unit 110 is mainly utilized for changing the up-bridge control signal $S_{up}$ and a down-bridge control signal $S_{down}$ from logic 0 to logic 1 when the processed inductor output voltage $V_d$ is over the specific gain voltage $V_{ref\_g}$, and maintain length of the on time $T_{ontime}$. Please note that there are various design modifications and alterations of the control methods between the control unit 110 and the switch 102 according to different designs between the control unit 110 and the switch 102; however, the various design modifications and alterations of the control methods should fall into the disclosed scope of the present invention as long as the control methods are on the basis of the same spirit or can generate similar effects. For example, the control unit 110 comprises: a comparator 1102, a fixed conducting time unit 1104, and a non-overlap processing unit 1106. The comparator 1102 is utilized for comparing the processed inductor output voltage $V_d$ and the specific gain voltage $V_{ref\_g}$ to generate a comparing result. The fixed conducting time unit 1104 is utilized for generating the on time control signal $S_{ontime}$ according to the comparing result $S_{com}$. The non-overlap processing unit 1106 is utilized for performing a non-overlap process before outputting the up-bridge control signal $S_{up}$ and a down-bridge control signal $S_{down}$, so as to prevent the PMOS 1022 and the NMOS 1024 in the switch 102 from conducting in the same time.

ripple-based control switching regulating method for controlling a ripple-based control switching regulator comprising a switch, an inductor coupled to the switch, and a capacitor coupled to the inductor, the ripple-based control switching regulating method comprising:

Please refer to FIG. 5. FIG. 5 is a flowchart showing a ripple-based control switching regulating method 500 in accordance with an exemplary embodiment of the present invention, wherein the ripple-based control switching regulating method 500 is utilized for controlling a ripple-based control switching regulator comprising a switch, an inductor coupled to the switch, and a capacitor coupled to the inductor. Provided that the result is substantially the same, the steps in FIG. 5 are not required to be executed in the exact order of flowchart 500 shown in FIG. 5. Moreover, some steps in FIG. 5 can be omitted according to different embodiments or design requirements. The ripple-based control switching regulating method 500 disclosed by the present invention comprises the following steps:

Step S502: Utilize the switch for selectively outputting a first reference voltage or a second reference voltage as an output voltage according to a control signal;

Step S504: Utilize the inductor for producing an inductor output voltage according to the output voltage;

Step S506: Detect whether the output voltage has a double pulse to generate a detecting result;

Step S508: Generate a calibrated output voltage according to the detecting result, the output voltage, and the inductor output voltage Step S510: Differentiate the calibrated output voltage to generate the processed inductor output voltage;

Step S512: Generate a comparing result according to the processed inductor output voltage and a predefined voltage;

Step S514: Generate the control signal according to the comparing result.

The steps 502-514 of the ripple-based control switching regulating method 500 should be clearly understood by those of average skill in this art after reading the operational details and configuration details for FIGS. 1-4, and thus further explanation of the details and operations for the steps 502-514 of the ripple-based control switching regulating method 500 are omitted herein for the sake of brevity.

Briefly summarized, the embodiments disclosed by the present invention avoid double pulse by calibrating the parasitic inductor effect, and compared with the prior art which measures the inductor current directly, the method of calibrating parasitic the inductor effect in the present invention has advantages of lower cost and smaller error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A ripple-based control switching regulator, comprising:
    a switch, for selectively outputting a first reference voltage or a second reference voltage as an output voltage according to a control signal;
    an inductor, coupled to the switch, for producing an inductor output voltage according to the output voltage;
    a capacitor, coupled to the inductor;
    an output voltage processing unit, for outputting a processed inductor output voltage according to the output voltage and the inductor output voltage, wherein the output voltage processing unit comprises:
        a double pulse detecting unit, for detecting whether the output voltage has a double pulse to generate a detecting result; and
        a voltage calibrating unit, for generating the processed inductor output voltage according to the detecting result, the output voltage, and the inductor output voltage, wherein the voltage calibrating unit comprises:
            a calibrating circuit, for generating a calibrated output voltage according to the detecting result, the output voltage, and the inductor output voltage; and
            a differentiator, for differentiating the calibrated output voltage to generate the processed inductor output voltage; and
    a control unit, for outputting the control signal according to at least the processed inductor output voltage.

2. The ripple-based control switching regulator of claim 1, wherein the calibrating circuit comprises:
    a first operating amplifier, having a first input terminal, a second input terminal, and an output terminal, wherein the first input terminal is utilized for receiving the inductor output voltage, and the output terminal is utilized for outputting the calibrated output voltage;
    a gain adjusting circuit, having a gain value, for performing a gain process for the output voltage and generating a gain output voltage at an output terminal, wherein the gain value is adjusted according to the detecting result; and
    a first voltage dividing circuit, coupled between the output terminal of the first operating amplifier and the output terminal of the gain adjusting circuit, for generating a first divided voltage to the second input terminal of the first operating amplifier.

3. The ripple-based control switching regulator of claim 2, wherein when the double pulse detecting unit shows that the output voltage has the double pulse, the gain adjusting circuit adjusts the gain value.

4. The ripple-based control switching regulator of claim 2, further comprising:
    a second operating amplifier, having a first input terminal, a second input terminal, and an output terminal, wherein the first input terminal of the second operating amplifier is utilized for receiving a predefined voltage; and
    a second voltage dividing circuit, coupled between the output terminal of the second operating amplifier and a third reference voltage, for generating a second divided voltage to the second input terminal of the second operating amplifier;
    wherein the control unit
    outputs the control signal according to the processed inductor output voltage and an output voltage of the output terminal of the second operating amplifier.

5. The ripple-based control switching regulator of claim 4, wherein the first voltage dividing circuit and the second voltage dividing circuit have a same voltage dividing ratio.

6. The ripple-based control switching regulator of claim 4, wherein the first reference voltage is a supply voltage, and the second reference voltage and the third reference voltage are ground voltage.

7. The ripple-based control switching regulator of claim 1, wherein the control unit comprises:
    a comparator, for generating a comparing result according to the processed inductor output voltage and a predefined voltage; and
    a control signal generating circuit, for generating the control signal according to the comparing result.

8. A ripple-based control switching regulating method for controlling a ripple-based control switching regulator comprising a switch, an inductor coupled to the switch, and a capacitor coupled to the inductor, the ripple-based control switching regulating method comprising:
    utilizing the switch for selectively outputting a first reference voltage or a second reference voltage as an output voltage according to a control signal;
    utilizing the inductor for producing an inductor output voltage according to the output voltage;
    outputting a processed inductor output voltage according to the output voltage and the inductor output voltage by performing the following steps:
        detecting whether the output voltage has a double pulse to generate a detecting result; and
        generating the processed inductor output voltage according to the detecting result, the output voltage, and the inductor output voltage by performing the following steps:
            generating a calibrated output voltage according to the detecting result, the output voltage, and the inductor output voltage; and
            differentiating the calibrated output voltage to generate the processed inductor output voltage; and
    utilizing a control unit for outputting the control signal according to at least the processed inductor output voltage.

9. The ripple-based control switching regulating method of claim 8, wherein the step of generating a calibrated output voltage according to the detecting result, the output voltage, and the inductor output voltage comprises:
    utilizing a first operating amplifier to perform a negative feedback loop, wherein the first operating amplifier has a first input terminal, a second input terminal, and an output terminal, wherein the first input terminal is utilized for receiving the inductor output voltage, and the output terminal is utilized for outputting the calibrated output voltage;
    performing a gain process for the output voltage and generating a gain output voltage at an output terminal, wherein the gain value is adjusted according to the detecting result; and utilizing a first voltage dividing circuit for generating a first divided voltage to the second input terminal of the first operating amplifier, wherein the first voltage dividing circuit is coupled between the output terminal of the first operating amplifier and the gain output voltage.

10. The ripple-based control switching regulating method of claim 9, wherein when the detecting result shows that the output voltage has the double pulse, the gain adjusting circuit adjusts the gain value constantly until the detecting shows that the output voltage does not have any double pulse.

11. The ripple-based control switching regulating method of claim 8, wherein the step of outputting the control signal according to the processed inductor output voltage comprises:

generating a comparing result according to the processed inductor output voltage and a predefined voltage; and
generating the control signal according to the comparing result.

* * * * *